(No Model.)

J. CLAY.
ROLLER CULTIVATOR.

No. 337,480.  Patented Mar. 9, 1886.

Witnesses,
Geo. H. Strong.
J. H. Tonks.

Inventor,
John Clay.
By Dewey & Co.
Att'ys.

UNITED STATES PATENT OFFICE.

JOHN CLAY, OF CAMPTONVILLE, CALIFORNIA.

ROLLER-CULTIVATOR.

SPECIFICATION forming part of Letters Patent No. 337,480, dated March 9, 1886.

Application filed November 28, 1885. Serial No. 184,222. (No model.)

*To all whom it may concern:*

Be it known that I, JOHN CLAY, of Camptonville, county of Yuba, and State of California, have invented an Improvement in Roller-Cultivators; and I hereby declare the following to be a full, clear, and exact description thereof.

My invention relates to that class of agricultural implements used for cultivating the ground, and particularly to those known as "roller-cultivators;" and my invention consists in a rolling frame or cylindrical core having hinged to its periphery a number of independent sections, preferably three, each section comprising a number of parallel bars hinged to each other and provided with teeth.

The object of my invention is to provide an implement adapted for perfectly working the surface of all lands to be cultivated.

Figure 1:
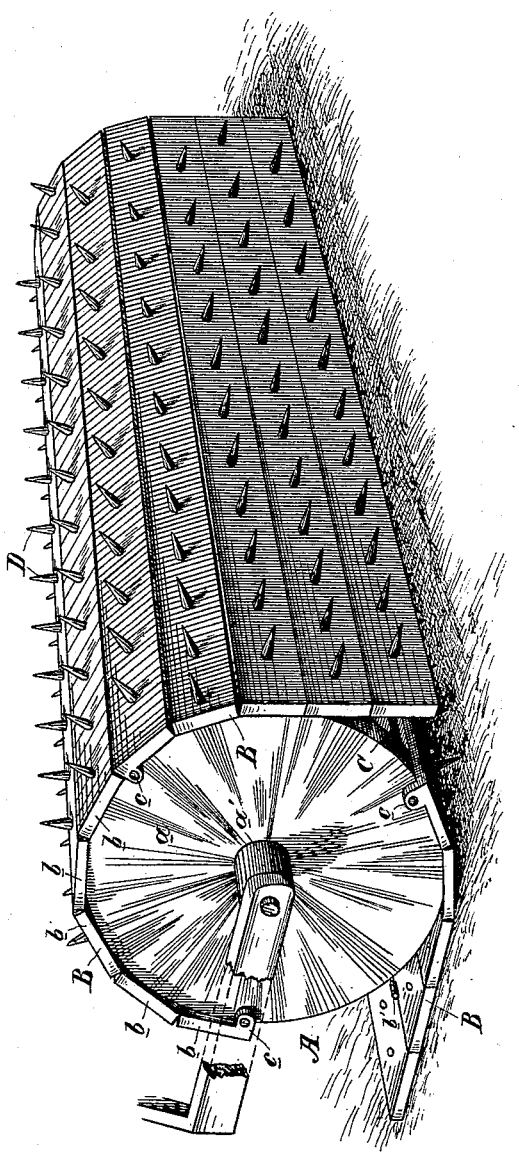
Figure 2:
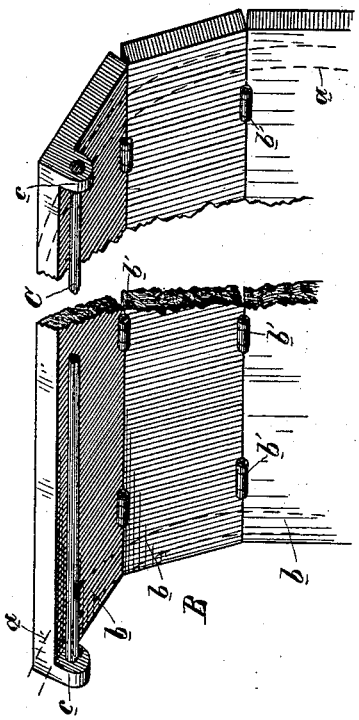

Referring to the accompanying drawings, Figure 1 is a perspective view of my roller-cultivator. Fig. 2 is an inside view of a portion of one of the sections.

The roller or core A, which may consist of any suitable cylindrical body, is preferably, for the sake of lightness and strength, composed of two end disks or wheels, $a$, connected by an axle, $a'$.

B are the sections, which, though, as I have before said, they may be in any number, according to the size of the implement and the work to be done, are preferably three in number, as here shown. These sections are independent of each other and cover the entire periphery of the roller or core A, the periphery of the wheels included, which therefore do not touch the ground, but travel on the sections. Each section is hinged at its base to the roller or core in some suitable manner, as by the rods C, passing through ears or lugs $c$ on the sections, and extending the entire length of the core, thus not only acting as pivots, but also as braces for the implement.

Each section B is composed of a number of parallel bars $b$, hinged together at their inner meeting edges by hinges $b'$, so that they may not only lie out flat upon the ground, but may wind upon the core A by conforming themselves to its curvature. The bars $b$ are provided with teeth D.

A suitable draft mechanism is to be attached to the implement.

The operation of my cultivator is as follows: As it rolls along, each section B, as it passes its center of gravity, drops forward away from its seat upon the periphery of the core and falls flat upon the ground, its teeth breaking the clods, and the core, advancing, rolls over the fallen section, pulverizing the broken clods, and winding up the section behind it while a second section is dropping down. The teeth and bars of the sections clear themselves, as they wind upon the core, of earth sticking to and between them, because of their greater separation in conforming to the curvature of the core than when lying on the ground. The blows received from the falling sections cause the soil to break and pulverize in a most thorough manner, reducing the clods to fine soil.

I am aware that previous to my invention rotary cultivators have been provided with pivoted or swinging teeth secured directly to a revolving carrier, and hence I make no claim to such general construction. My invention differs from the devices above referred to, in that the teeth of my cultivator are attached to the extended and flexible sections hereinbefore described, whereby superior thoroughness and greater range of work are attained.

Having thus described my invention, what I claim as new, and desire to secure by Letters Patent, is—

1. A roller-cultivator comprising a cylindrical core and independent toothed sections hinged to said core and adapted to drop out from the core to the ground, substantially as herein described.

2. A roller-cultivator comprising a cylindrical core and independent toothed sections hinged to and covering the periphery of the core, substantially as and for the purpose described.

3. A roller-cultivator comprising a cylindrical core and independent toothed sections hinged to the core, each section being composed of parallel bars hinged to each other, substantially as and for the purpose herein described.

4. A roller-cultivator comprising the cylindrical core A, the independent sections B, hinged to the core and covering its periphery, the parallel bars $b$, of which the sections are composed, said bars being hinged together, and the teeth D upon the bars, substantially as herein described.

5. A roller-cultivator comprising the disks or wheels $a$ and axle $a'$, forming a roller or core, A, the independent sections B, having ears or lugs $c$, and the pivot brace-bolts C, passing through said ears and the disks of the core, the parallel bars $b$, of which the sections are composed, said bars being hinged to each other, and the teeth D on the bars, substantially as herein described.

In witness whereof I have hereunto set my hand.

JOHN CLAY.

Witnesses:
C. H. WHITTEMORE,
JAMES NELSON.